US 9,706,212 B2

(12) United States Patent
Yu et al.

(10) Patent No.: US 9,706,212 B2
(45) Date of Patent: Jul. 11, 2017

(54) PALETTE MODE IN HIGH EFFICIENCY VIDEO CODING (HEVC) SCREEN CONTENT CODING (SCC)

(71) Applicant: Futurewei Technologies, Inc., Plano, TX (US)

(72) Inventors: Haoping Yu, Carmel, IN (US); Wei Wang, San Jose, CA (US); Zhan Ma, Fremont, CA (US); Meng Xu, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/873,558

(22) Filed: Oct. 2, 2015

(65) Prior Publication Data

US 2016/0100174 A1 Apr. 7, 2016

Related U.S. Application Data

(60) Provisional application No. 62/060,450, filed on Oct. 6, 2014.

(51) Int. Cl.
*H04N 19/176* (2014.01)
*H04N 19/186* (2014.01)
(Continued)

(52) U.S. Cl.
CPC ......... *H04N 19/186* (2014.11); *H04N 19/103* (2014.11); *H04N 19/13* (2014.11);
(Continued)

(58) Field of Classification Search
CPC .... H04N 19/172; H04N 19/186; H04N 19/44; H04N 19/103; H04N 19/176;
(Continued)

(56) References Cited

U.S. PATENT DOCUMENTS 6,219,445 B1 *   4/2001   Todoroki ................ G06T 9/005
                                                                  382/166
2009/0010533 A1   1/2009   Hung
                           (Continued)

FOREIGN PATENT DOCUMENTS

GB    2114404 A    8/1983
JP    H06180573 A  6/1994
WO    2013177975 a1 12/2013

OTHER PUBLICATIONS

Zhu, et al., "AHG10: Modified Copy Above Mode for Palette Based Coding," Joint Collaborative Team on Video Coding (JCT-VC) of ITU-T SG 16 WP3 and ISO/IEC JTC 1/SC 29/WG 11, URL: http://wftp3.itu.int/av-arch/jctvc-site/,,No.     JCTVC-Q0174-v2, Document: JCTVC-Q0174, 17th Meeting: Valencia, ES, Mar. 27-Apr. 4, 2014, 4 pages. XP030116122.

(Continued)

*Primary Examiner* — Nathanel Aynalem
(74) *Attorney, Agent, or Firm* — Conley Rose, P.C.

(57) ABSTRACT

An encoding apparatus, decoding apparatus, and coding methods. The encoding apparatus includes a processor configured to receive a video frame including screen content, generate a block containing an index map of colors for screen content in the video frame, wherein the block includes strings of index values sharing a same escape color index value, wherein the escape color index value represents an escape color, encode each of the strings of index values in the block, and sequentially encode the escape colors after each of the strings of index values in the block has been encoded. A transmitter operably coupled to the processor is configured to transmit the strings of index values and the escape colors in a bitstream to a decoding apparatus.

8 Claims, 9 Drawing Sheets

(51) Int. Cl.

| | |
|---|---|
| H04N 19/172 | (2014.01) |
| H04N 19/44 | (2014.01) |
| H04N 19/70 | (2014.01) |
| H04N 19/13 | (2014.01) |
| H04N 19/593 | (2014.01) |
| H04N 19/103 | (2014.01) |
| H04N 19/463 | (2014.01) |
| H04N 19/91 | (2014.01) |
| H04N 19/182 | (2014.01) |
| H04N 19/124 | (2014.01) |
| H04N 19/94 | (2014.01) |

(52) U.S. Cl.
CPC ......... *H04N 19/172* (2014.11); *H04N 19/176* (2014.11); *H04N 19/182* (2014.11); *H04N 19/44* (2014.11); *H04N 19/463* (2014.11); *H04N 19/593* (2014.11); *H04N 19/70* (2014.11); *H04N 19/91* (2014.11); *H04N 19/124* (2014.11); *H04N 19/94* (2014.11)

(58) Field of Classification Search
CPC .. H04N 19/182; H04N 19/463; H04N 19/593; H04N 19/70; H04N 19/91
USPC ....................................... 375/240.01–240.29
See application file for complete search history.

(56) References Cited

U.S. PATENT DOCUMENTS

| | | | |
|---|---|---|---|
| 2015/0098513 A1 | 4/2015 | Fu et al. | |
| 2015/0186100 A1* | 7/2015 | Tsai | G06F 3/1454 375/240.12 |
| 2015/0229933 A1* | 8/2015 | Guo | H04N 19/103 375/240.02 |
| 2015/0264363 A1* | 9/2015 | Pu | H04N 19/186 375/240.02 |
| 2015/0264365 A1* | 9/2015 | Tsai | H04N 19/593 375/240.03 |
| 2015/0341635 A1* | 11/2015 | Seregin | H04N 19/70 375/240.16 |

OTHER PUBLICATIONS

Pu, et al., "AGH10: Simplification of Palette Based Coding," Joint Collaborative Team on Video Coding (JCT-VC) of ITU-T SG16 WP3 and ISO/IEC JTC1/SC29/WG11, Document: JCTVC-Q0047r1, URL: http://wftp3.itu.int/av-arch/jctvc-site/,, No. JCTVC-Q0047-v3, 17th Meeting: Valencia, ES, Mar. 27-Apr. 4, 2014, 4 pages. XP030115937.

Gisquet, "Crosscheck of AHG10: Simplification of Palette Based Coding," Joint Collaborative Team on Video Coding (JCT-VC) of ITU-T SG 16 WP 3 and ISO/IEC JTC 1/SC 29/WG 11, URL: http://wftp3.itu.int/av-arch/jctvc-site/,,No. JCTVC-Q0178, Document JTCVC-Q0178, 17th Meeting: Valencia, ES, Mar. 27,-Apr. 4, 2014, 4 pages. XP030116127.

Xu, et al., "Non-CE6: Simplification on Escape Coding of Palette Mode in HEVC SCC," Joint Collaborative Team on Video Coding (JCT-VC) of ITU-T SG 16 WP 3 and ISO/IEC JTC 1/SC 29/WG 11, URL: http://wftp3.itu/int/av-arch/jctvc-site;,, No. JCTVC-S0150-v2, Document JTCVC-S0150, 19th Meeting: Strasbourg, FR, Oct. 17-24, 2014, 4 pages. XP030116921.

Foreign Communication from a Counterpart Application, PCT Application PCT/US2015/053683, International Search Report, Dec. 18, 2015, 6 pages.

Foreign Communication from a Counterpart Application, PCT Application PCT/US2015/053683, Written Opinion, Dec. 18, 2015, 9 pages.

Joshi, et al., "High Efficiency Video Coding (HEVC) Screen Content Coding: Draft 4," JCTVC-U1005_r1, ISO/IEC 23008-2:2015(E), Joint Collaborative Team on Video Coding (JCT-VC) of ITU-T SG 16 WP 3 and ISO/IEC JTC 1/SC 29/WG 11, 21st Meeting; Warsaw, Poland, Jun. 19-Jun. 26, 2015, 663 pages.

* cited by examiner

| | | | | | | | | |
|---|---|---|---|---|---|---|---|---|
| 102 | 1 | 1 | 1 | 1 | 2 | 2 | 2 | 2 |
| 104 | 1 | 1 | 1 | 1 | 1 | 1 | 1 | 1 |
| 106 | 1 | 1 | 1 | 1 | 1 | 1 | 1 | 1 |
| 108 | 1 | 1 | 3 (blue) | 3 (grn) | 2 | 2 | 2 | 2 |
| 110 | 1 | 1 | 3 (grn) | 3 (blue) | 2 | 2 | 2 | 2 |
| 112 | 2 | 2 | 3 (red) | 2 | 2 | 2 | 2 | 2 |
| 114 | 2 | 2 | 2 | 2 | 2 | 2 | 2 | 2 |
| 116 | 2 | 2 | 2 | 2 | 2 | 2 | 2 | 2 |

PALETTE MODE IN HIGH EFFICIENCY VIDEO CODING (HEVC) SCREEN CONTENT CODING (SCC)

The present application claims benefit of U.S. Provisional Patent Application No. 62/060,450 filed Oct. 6, 2014, by Haoping Yu, et al., and entitled, "Palette Mode in HEVC SCC," which is incorporated herein by reference as if reproduced in its entirety.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality without increasing bit-rates are desirable.

SUMMARY

In one embodiment, the disclosure includes a method of encoding including receiving a video frame including screen content, generating a block containing an index map of colors for screen content in the video frame, wherein the block includes strings of index values, encoding, by a processor, one or multiple consecutive index values in a first string of index values using a single escape color index value and a run value identifying how many of the consecutive escape color index values have been encoded, sequentially encoding, by the processor, escape colors corresponding to the two or more consecutive index values after all of the strings of index values of the block have been encoded, and transmitting, by a transmitter operably coupled to the processor, the strings of index values and the escape colors in a bitstream to a decoding apparatus.

In another embodiment, the disclosure includes a method of encoding including receiving a video frame including screen content, generating a block containing an index map of colors for screen content in the video frame, wherein the block includes strings of index values, encoding, by a processor, a first string of index values including an escape color index value, encoding, by the processor, a second string of index values including the escape color index value by copying the escape color index value from the first string of index values, sequentially encoding, by the processor, escape colors corresponding to the escape color index value in the first string of index values and in the second string of index values after all of the strings of index values of the block have been encoded, and transmitting, by a transmitter operably coupled to the processor, the strings of index values and the escape colors in a bitstream to a decoding apparatus.

In yet another embodiment, the disclosure includes an encoding apparatus including a processor configured to receive a video frame including screen content, generate a block containing an index map of colors for screen content in the video frame, wherein the block includes strings of index values sharing a same escape color index value, wherein the escape color index value represents an escape color, encode each of the strings of index values in the block, and sequentially encode the escape colors after each of the strings of index values in the block has been encoded, and a transmitter operably coupled to the processor and configured to transmit the strings of index values and the escape colors in a bitstream to a decoding apparatus.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. In use, an image or video frame may comprise a large amount of pixels (e.g., 2,073,600 pixels in a 1920×1080 frame). Thus, it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer greater than one and is often a multiple of four.

In the International Telecommunications Union (ITU) Telecommunications Standardization Sector (ITU-T) and the International Organization for Standardization (ISO)/International Electrotechnical Commission (IEC), new block concepts were introduced for High Efficiency Video Coding (HEVC). For example, coding unit (CU) may refer to a sub-partitioning of a video frame into rectangular blocks of equal or variable size. In HEVC, a CU may replace macroblock structure of previous standards. Depending on a mode of inter or intra prediction, a CU may comprise one or more prediction units (PUs), each of which may serve as a basic unit of prediction. For example, for intra prediction, an 8×8 CU may be symmetrically split into four 4×4 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Depending on the application, a block may be coded in either a lossless mode (e.g., no distortion or information loss) or a lossy mode (e.g., with distortion). In use, high quality videos (e.g., with YUV subsampling of 4:4:4) may be coded using a lossless mode, while low quality videos (e.g., with YUV subsampling of 4:2:0) may be coded using a lossy mode. As used herein, the Y component in YUV refers to the brightness of the color (the luminance or luma) while the U and V components refer to the color itself (the chroma). Sometimes, a single video frame or slice (e.g., with YUV subsampling of either 4:4:4 or 4:2:0) may employ both lossless and lossy modes to code a plurality of regions, which may be rectangular or irregular in shape. Each region may comprise a plurality of blocks. For example, a compound video may comprise a combination of different types of contents, such as text and computer graphic content (e.g., non-camera-captured images) and natural-view content (e.g., camera-captured video). In a compound frame, regions of texts and graphics may be coded in a lossless mode, while regions of natural-view content may be coded in a lossy mode. Lossless coding of texts and graphics may be desired in, for example, computer screen sharing applications, since lossy coding may lead to poor quality or fidelity of texts and graphics, which may cause eye fatigue.

With the rapid and continuous advancements made in semiconductors, networking, communications, displays, computers, and devices such as tablets and smart phones, many applications call for HEVC-based compression/coding solutions that can efficiently compress the non-camera-captured video content at high visual quality. This non-camera-captured video content, which may be referred to herein as screen content, may include computer generated graphics, text with typical motion commonly seen in applications such as window switching and moving, text scrolling, and the like. In many cases, the non-camera-captured video content provides clear textures and sharp edges with distinct colors at high contrast and may have a 4:4:4 color sampling format.

Current HEVC screen content coding introduces a palette mode to more efficiently represent computer screens. The palette mode is described in R. Joshi and J. Xu, Working Draft 2 of HEVC Screen Content Coding, MPEG-N14969/JCTVC-S1005, Strasbourg, FR, October 2014 (HEVC SCC), which is incorporated herein by this reference. The palette mode is also utilized in the Screen Content Coding Test Model (SCM) 2.0 reference software.

Despite the efficiency provided by the palette mode within the current HEVC framework, there is still room for improvement. Disclosed herein are systems and methods for improved video coding. The disclosure provides a simplified entropy (e.g., lossless) coding scheme. To reduce the overall complexity, the coding scheme encodes escape values at the end of the index map processing. By doing so, the coding scheme increases the number of index matches when using, for example, the COPY_ABOVE_MODE even though the index map contains an index value corresponding to an escape color. In addition, the coding scheme enables parallel processing of the index map and escape colors as opposed to the current solution in HEVC SCC, which does not support parallel processing of the index map because of the interleaved encoding of escape values and the other syntax of the indices. Moreover, the coding scheme streamlines the design of index map coding, improves throughput without sacrificing performance, and makes coding easier to describe and implement.

In palette-based coding, which may be particularly suitable for screen generated content coding, a video coder (e.g., a video encoder or video decoder) forms a "palette" of colors representing the video data of a given block. The palette may include the most dominant (e.g., frequently used) colors in the given block. The colors that are infrequently or rarely represented in the video data of the given block are not included in the palette. The colors that are not included in the palette are referred to as escape colors.

When an index map corresponding to the given block is coded during palette mode coding, each of the colors included in the palette is assigned an index value. For example, if the colors black and white are included in the palette, the color white may have an index value of 0 and the color black may have an index value of 1. In addition, each of the colors not included in the palette are assigned, for example, a single or common index value. For example, if the colors blue, green, and red are not included in the palette, these colors will all have an index value of 3. The index value for the colors not included in the palette may be referred to as an escape color index value.

The current HEVC SCC draft utilizes a run-based one-dimensional (1-D) string copy. Even so, two-dimensional (2-D) string copy methods have been proposed in W. Wang, Z. Ma, M. Xu, H. Yu, "Non-CE6: 2-D Index Map Coding of Palette Mode in HEVC SCC," JCTVC-S0151, Strasbourg, FR, October 2014, and U.S. Provisional Patent Application No. 62/060,450 entitled, "Palette Mode in HEVC SCC," filed October 2014, which are incorporated herein by this reference. While not fully described herein for the sake of brevity, those skilled in the art will appreciate that the 2-D string copy methods may default to a run based 1-D string copy method in some circumstances.

When index mode coding in palette mode using the 1-D string method, two main parts are involved for each CU. Those two parts are color table processing and index map coding. By way of example, the index map coding for the 1-D string method may utilize a COPY_ABOVE mode, where COPY_ABOVE_MODE is applied to indicate whether the current string is identical to the indices from the string directly above the current string.

Figure 1:
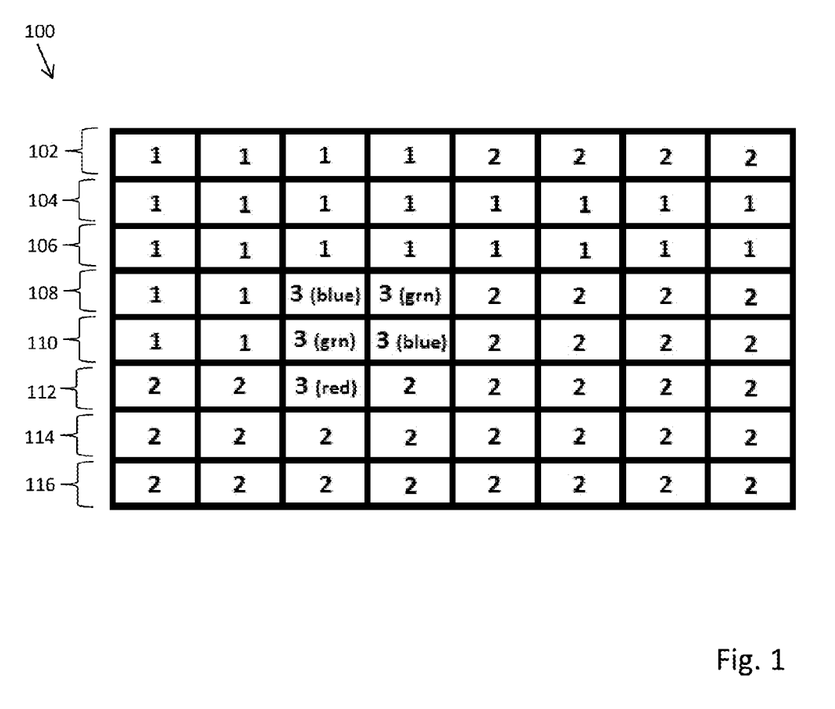
FIG. 1 is a diagram of index map colors in a block used to illustrate index map coding using the palette mode.

FIG. 1 illustrates an 8×8 block 100 of index map colors that will be used to provide an example of index map coding using the palette mode. As shown, a top string 102 in the block 100 has the index values 1, 1, 1, 1, 2, 2, 2, and 2 (from left to right), the string 104 immediately below the top string 102 has the index values 1, 1, 1, 1, 1, 1, 1, and 1, the next string 106 in the block 100 has the index values 1, 1, 1, 1, 1, 1, 1 and 1, the next string 108 in the block 100 has the index values 1, 1, 3 (where the 3 represents blue), 2, 2, 2, 2 and 2, the next string 110 in the block 100 has the index values 1, 1, 3 (where the 3 represents green), 2, 2, 2, 2 and 2, the next string 112 in the block 100 has the index values 1, 1, 3 (where the 3 represents red), 2, 2, 2, 2 and 2, the next string 114 in the block 100 has the index values 2, 2, 2, 2, 2, 2, 2 and 2, and the bottom string 116 in the block 100 has the index values 2, 2, 2, 2, 2, 2, 2, and 2. To encode the first string 102 in a bitstream, a palette_run_type flag (e.g., a one-bit palette_run_type_flag), an index value, and a run value are used.

The palette_run_type flag indicates whether any index values in the string above the current string have been copied. If a portion of the string above has been copied, the palette_run_type flag is set to a first binary number (e.g., 1) representing the COPY_ABOVE_MODE. If the string above has not been copied, the palette_run_type flag is set to a second binary number (e.g., 0) representing the COPY_INDEX_MODE. When encoding the top string 102, the palette_run_type flag is set to 0 by default because there are no strings disposed above the top string 102. The index value is the particular number value (e.g., 1 or 2) represented within the string in the block 100. The run value is how many consecutive index values may be copied. For example, if the run value is set to 1, a single index value is copied, if the run value is set to 2, two consecutive index values are copied, if the run value is set to 3, three consecutive run values are copied, and so on. So, to encode the top string 102 having the index values 1, 1, 1, 1, 2, 2, 2, 2, the following syntax is used: palette_run_type_flag=0, index value=1, run value=4, palette_run_type_flag=0, index value=2, run value=4.

To encode the next string 104 having index values 1, 1, 1, 1, 1, 1, 1, 1, the following syntax may be used: palette_run_type_flag=1, run value=4, palette_run_type_flag=0, index value=1, run value=4. In the alternative, the following syntax may also be used: palette_run_type_flag=0, run value=8. To encode the next string 106 having index values 1, 1, 1, 1, 1, 1, 1, 1, the following syntax is used: palette_run_type_flag=1, run value=8. The particular syntax used for encoding may be determined by, for example, a rate-distortion optimization module or other suitable encoder component. The rate-distortion optimization module may select the particular syntax based on, for example, which syntax is most efficient to code. As an example, all the indices in string 104 and 106 may be encoded as palette_run_type_flag=0, index value=1, run=16.

The next string 108 has the index values 1, 1, 3, 3, 2, 2, 2, 2, where the 3 is an escape color index value corresponding to the escape color blue or the escape color green. Using the existing conventional coding scheme, the following syntax is used to encode next string 108: palette_run_type_flag=1, run value=2, palette_run_type_flag=0, index value=3, escape color=blue, palette_run_type_flag=0, index value=3, escape color=green, palette_run_type_flag=0, index value=2, run value=4. Likewise, using the existing conventional coding scheme, the following syntax is used to encode the next string 110: palette_run_type_flag=1, run value=2, palette_run_type_flag=0, index value=3, escape color=green, palette_run_type_flag=0, index value=3, escape color=blue, palette_run_type_flag=1, run value=4. Using the existing conventional coding scheme, the following syntax is used to encode the next string 112: palette_run_type_flag=1, run value=2, palette_run_type_flag=0, index value=3, escape color=red, palette_run_type_flag=1, run value=5.

So, as shown above, when coding the next string 108, the next string 110, and the next string 112 using the conventional coding scheme, an identification of the particular escape color is encoded immediately after the escape color index value in the block 100. Unfortunately, coding in this manner has disadvantages. For example, the ability to take full advantage of the COPY_ABOVE_MODE and COPY_INDEX_MODE is limited when the escape colors in the same string or in neighboring strings are different from each other. For example, when the escape color corresponding to the escape color index value of 3 in the next string 108 is blue and the escape color corresponding to the escape color index value of 3 in the next string 110 is green, the ability of use the COPY_ABOVE_MODE is lost because the escape color of each string is different. Similarly, two consecutive escape colors have to be coded individually with two palette_run_type_flag=0 syntax elements.

It has been discovered, however, that there is a way to code the strings (e.g., strings 108-112) in block 100 such that the COPY_ABOVE_MODE and COPY_INDEX_MODE functionality may be used even when the escape colors of neighboring strings are different from each other. In that regard, a coding scheme is proposed whereby the escape color index values are encoded as part of encoding the string while the escape colors themselves are sequentially coded at the end of the index map coding instead of being encoded immediately after the escape color index value. Referring to FIG. 1 again, an example of the proposed new coding scheme is presented below.

To encode the next string 108, the following syntax is used: palette_run_type_flag=1, run value=2, palette_run_type_flag=0, index value=3, run value=2, palette_run_type_flag=0, index value=2, run value=4. The next string 110 is encoded as: palette_run_type_flag=1, run value=8. The next string 112 is encoded as: palette_run_type_flag=0, index value=2, run value=2, palette_run_type=0, index value=3, run value=1, palette_run_type_flag=0, index value=2, run value=5. Thus, the escape colors in string 108, 110, and 112, are encoded using COPY_ABOVE_MODE or COPY_INDEX_MODE with a run value even though the escape colors in these strings are different.

Continuing with the coding of block 100, the next string 114 is encoded as: palette_run_type_flag=0, index value=2, run value=8. The bottom string 116 is encoded as palette_run_type_flag=1, run value=8. In an embodiment, next string 110, 112, 114, and 116 may be encoded as: palette_run_type_flag=1, run value=11, palette_run_type_flag=0, index value=2, run value=21.

After each of the strings 102-116 in the block 110 has been encoded as noted above, the escape colors are sequentially coded at the end of the index map coding. As such, after the index map coding of the bottom string 116, the following syntax is encoded to identify each of the escape colors in the order they are encountered in the block 100: escape color=blue, green, green, blue, red. Thus, the first escape color corresponding to the first index value of 3 encountered in the block (e.g., in string 108) is identified as being blue, the next escape color corresponding to the second index value of 3 encountered in the block (e.g., in string 108) is identified as being green, the next escape color corresponding to the second index value of 3 encountered in the block (e.g., in string 110) is identified as being green, the next escape color corresponding to the second index value of 3 encountered in the block (e.g., in string 110) is identified as being blue, and the last escape color corresponding to the third index value of 3 encountered in the block (e.g., in string 112) is identified as being red. By coding in this fashion, a variety of benefits are realized. For example, the COPY_ABOVE_MODE functionality may be used even when escape colors in the same string or in neighboring strings are different from each other. In addition, COPY_INDEX MODE may be used to encode consecutive escape colors altogether by a single escape color index value along with a run value that corresponds to the number of consecutive escape colors. Indeed, in an embodiment the escape color index values and the other index values are encoded the same way and/or in similar fashion. In addition, the new coding scheme allows for increased matched indices without having to stop coding, permits parallel processing of the index map and index map colors, and streamlines the design of index map coding.

Figure 2A:
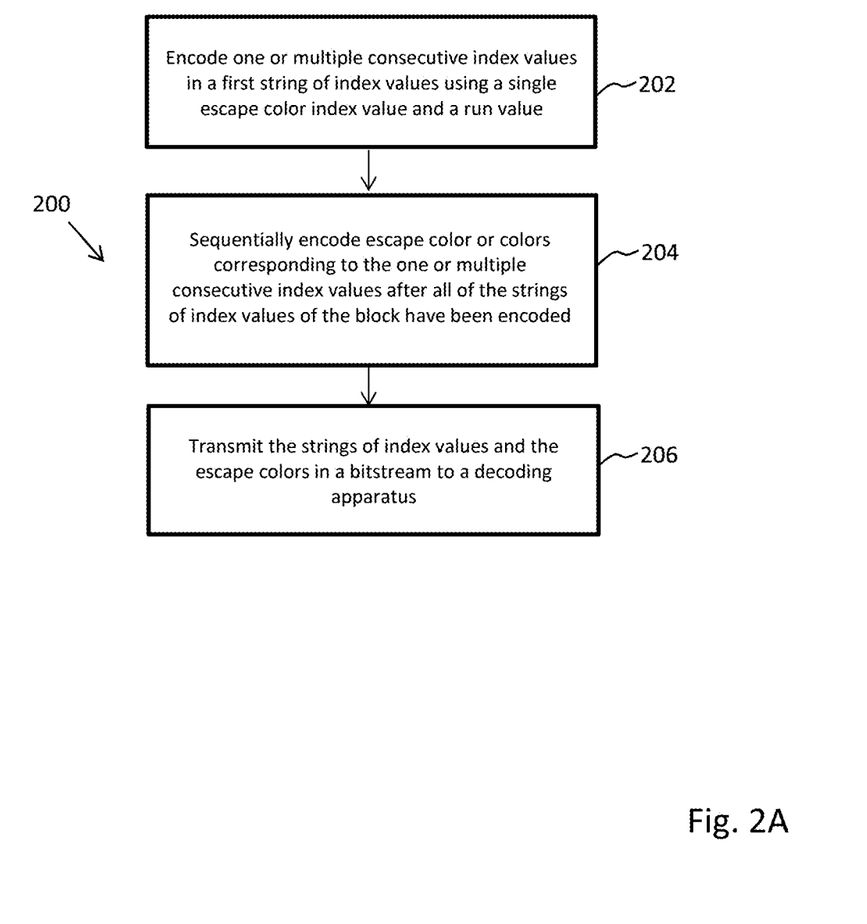
FIG. 2A is a flowchart of an embodiment of a method of coding using a simplified context model.

FIG. 2A is a flowchart of an embodiment of a method 200 of coding escape colors. The method 200 may be implemented when, for example, a video frame has been received and the escape colors need to be efficiently encoded for a bitstream that will be transmitted to a decoding apparatus. In block 202, one or multiple consecutive index values in a first string of index values (e.g., next string 108 of FIG. 1) are encoded using a single escape color index value (e.g., the value 3 in FIG. 1) and a run value identifying how many of the consecutive escape color index values were encoded. In block 204, escape colors corresponding to the multiple consecutive index values are encoded after all of the strings of index values of the block (e.g., block 100 of FIG. 1) have been encoded. In an embodiment, the escape colors are different from each other. For example, a first escape color may be blue, a second escape color may be green, a third escape color may be red, and so on. Those skilled in the art will appreciate upon review of this disclosure that additional strings (e.g., top string 102, next string 104, next string 106) having escape colors may also be encoded in the same fashion. The escape color index values in any additional strings will have the same escape color index value (e.g., the value 3 in FIG. 1) used with other strings. In addition, any escape color represented by one of the additional escape color index values is sequentially encoded with respect to the first and second escape colors. In block 206, the strings of index values and the escape colors are transmitted in a bitstream to a decoding apparatus.

Figure 2B:
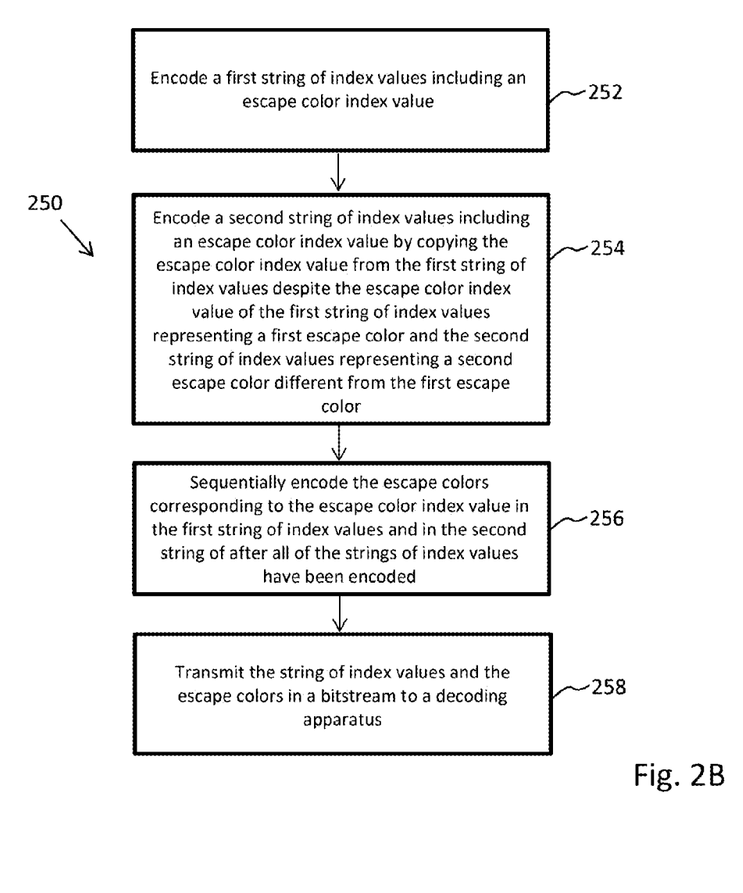
FIG. 2B is a flowchart of an embodiment of a method of coding using a simplified context model.

FIG. 2B is a flowchart of an embodiment of a method 250 of coding escape colors. The method 250 may be implemented when, for example, a video frame has been received and the escape colors need to be efficiently encoded for a bitstream that will be transmitted to a decoding apparatus. In block 252, a first string of index values (e.g., next string 108 of FIG. 1) including an escape color index value (e.g., the value 3 in FIG. 1) is encoded. In block 254, a second string of index values (e.g., next string 110 of FIG. 1) including the escape color index value (e.g., the same value 3 in FIG. 1) is encoded by copying the escape color index value from the first string of index values. In an embodiment, the copying occurs despite escape color index value of the first string of index values representing a first escape color (e.g., blue) and the second string of index values representing a second escape color (e.g., green) different from the first escape color. In an embodiment, the escape color index value in the first string of index values is one of multiple escape color index values in the first string (e.g., a first string of 1 1 2 3 2 3 1 1) and the escape color index value in the second string of index values is one of multiple escape color index values in the second string (e.g., a second string of 2 1 2 3 2 3 1 1). In an embodiment, the escape color index value in the first string of index values is one of multiple consecutive escape color index values in the first string (e.g., a first string of 1 1 2 3 3 3 1 1) and the escape color index value in the second string of index values is one of multiple consecutive escape color index values in the second string (e.g., a second string of 2 1 2 3 3 3 1 1). In both cases, the last 7 index values of the second string, including the escape color index values, will be encoded altogether by copying the last 7 index values from the first string.

In block 256, the first escape color (e.g., blue) and the second escape color (e.g., green) are sequentially encoded after all of the strings of index values of the block (e.g., block 100 of FIG. 1) have been encoded. Those skilled in the art will appreciate upon review of this disclosure that additional strings (e.g., top string 102, next string 104, next string 106) may be encoded before the first string of index values in block 252. In addition, additional strings (e.g., next string 112, next string 114, and bottom string 116) may be encoded after the second string of index values in block 254. Additional escape color index values in any additional strings will have the same escape color index value (e.g., the value 3 in FIG. 1) used with other strings. In addition, any escape color represented by one of the additional escape color index values is sequentially encoded with respect to the first and second escape colors. In block 258, the strings of index values and the escape colors are transmitted in a bitstream to a decoding apparatus.

Figure 2C:
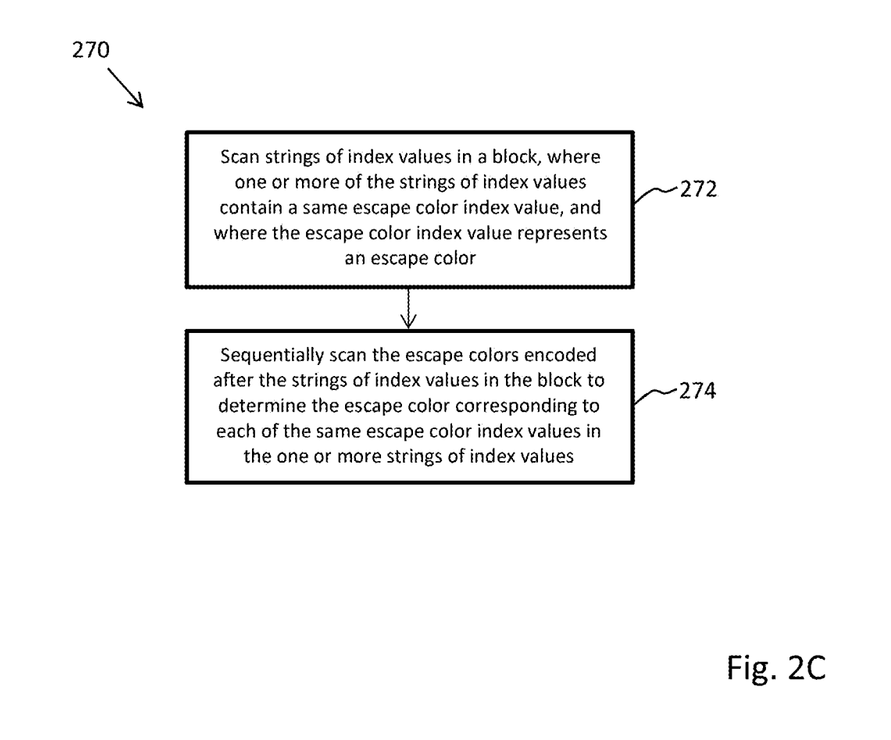
FIG. 2C is a flowchart of an embodiment of a method of coding using a simplified context model.

FIG. 2C is a flowchart of an embodiment of a method 270 of coding escape colors. The method 270 may be implemented when, for example, a bitstream has been received by a decoding apparatus and the escape colors need to be decoded in order to display, for example, screen content. In block 272, a decoder receiving the bitstream scans strings of index values in a block. One or more of the strings of index values contains a same escape color index value (e.g., the value 3) that represents an escape color (e.g., blue, red, green, etc.). In block 274, the decoder sequentially scans the escape colors encoded after the strings of index values in the block to determine the escape color corresponding to each of the same escape color index values in the one or more strings of index values. Thereafter, the screen content corresponding to the information in the bitstream may be, for example, displayed for a user.

An example of syntax for the improved escape coding described herein is shown in Table 1:

```
palette_escape_val_present_flag                               ae(v)
if( palette_escape_val_present_ flag )
    indexMax = palette_size
else
    indexMax = palette_size − 1
scanPos = 0
```

```
            while( scanPos < nCbS * nCbS ) {
                xC = x0 + travScan[ scanPos ][ 0 ]
                yC = y0 + travScan[ scanPos ][ 1 ]
                if( scanPos > 0) {
                    xC_prev = x0 + travScan[ scanPos − 1 ][ 0 ]
                    yC_prev = y0 + travScan[ scanPos − 1 ][ 1 ]
                }
        if( scanPos > = nCbS && palette_mode[xC_prev][yC_prev] ! = COPY_ABOVE)
                palette_mode[ xC ][ yC ]                                                        ae(v)
            if( palette_mode[ xC ][ yC ] ! = COPY_ABOVE ) {
                adjustedIndexMax = indexMax
                adjustedRefIndex = indexMax + 1
            }
            if( scanPos > 0 ) {
                if( palette_mode[xC_prev][yC_prev] = = INDEX ){
                    adjustedIndexMax − = 1
                    if ( palette_index [xC_prev][yC_Prev] == palette size )
                        adjustedRefIndex = adjustedIndexMax
                    else
                        adjustedRefIndex = paletteMap[ xC_prev ][ yC_prev ]
                }
                if( scanPos > = nCbS && (palette_mode[ xC_prev ][ yC_prev ] = = COPY_ABOVE
                ) ) {
                    adjustedIndexMax − = 1
                    if( palette_index [xC_prev][yC_Prev] == palette_size )
                        adjustedRefIndex = adjustedIndexMax
                    else
                        adjustedRefIndex = paletteMap[ xC ][ yC − 1 ]
                }
            }
            if( palette_mode[ xC ][ yC ] ! = COPY_ABOVE ) {
                if( adjustedIndexMax > 0 )
                    palette_index                                                               ae(v)
                if( palette_index > = adjustedRefIndex )
                    palette_index++
            }
                palette_run                                                                     ae(v)
                runPos = 0
                runMode = palette_mode[ xC ][ yC ]
                while ( runPos < = palette_run ) {
                    xC = x0 + travScan[ scanPos ][ 0 ]
                    yC = y0 + travScan[ scanPos ][ 1 ]
                    if( palette_mode[ xC ][ yC ] = = INDEX ) {
                        paletteMap[ xC ][ yC ] = palette_index
                    } else {
                        paletteMap[ xC ][ yC ] = paletteMap[ xC ][ y − 1 ]
                    }
                    runPos++
                    scanPos++
                }
        }
        scanPos = 0
        while( scanPos < nCbS * nCbS ) {
            if (palette_index[scanPos] = = palette_size) {
                for( cIdx = 0; cIdx < 3; cIdx++ ) {
                    palette_escape_val
                    paletteEscapeVal[ cIdx ][ xC ][ yC ] = palette_escape_val
                }
                scanPos++
            }
        }
        previousPaletteSize = palette_size
        current size = palette_size
        for( i = 0; i < palette_size; i++ )
            for ( cIdx = 0; cIdx < 3; cIdx++ )
                tempPaletteEntries[ cIdx ][ i ] = palette_entries[ cIdx ][ i ]
        for( i = 0; i < previousPaletteStuffingSize && current_size < max_palette_predictor_size;
        i++ )
            if( previous_palette_entry_flag[ i ] = = 0 ) {
                for ( cIdx = 0; cIdx < 3; cIdx++ )
                    tempPaletteEntries[ cIdx ][ current_size ] = previousPaletteEntries [ cIdx ][ i ]
                current_size++
            }
        previousPaletteStuffingSize = current_size
        previousPaletteEntries = tempPaletteEntries
}
```

Figure 3:
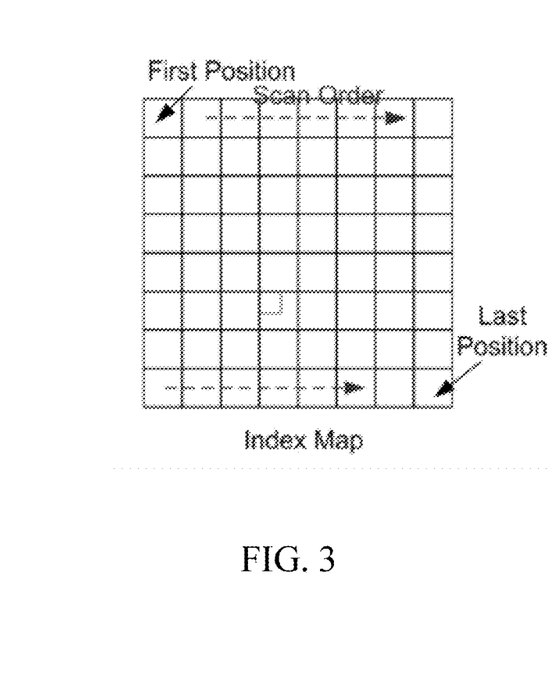
FIG. 3 is a diagram of an embodiment of a grouped index coding scheme.

In addition to the escape coding scheme noted above, a grouped index coding scheme may be implemented to improve coding. In the current HEVC SCC draft, the index map is processed at the CU level. For instance, for a 2N×2N CU, the index map is processed from the first position to the last one according to a predefined scan order as shown in FIG. 3.

Figure 4:
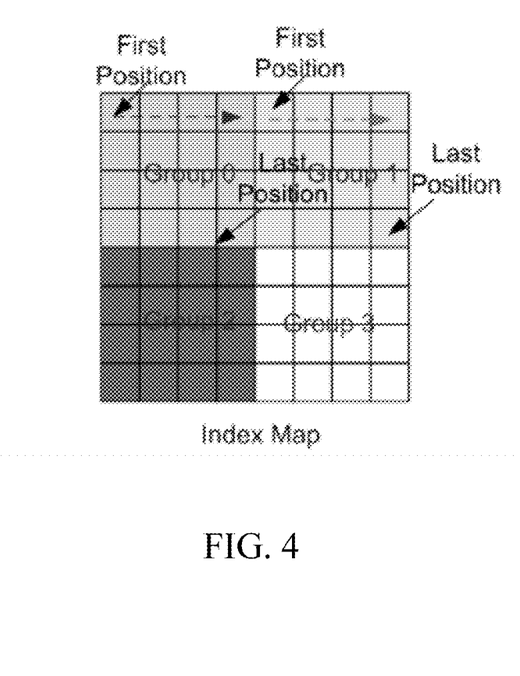
FIG. 4 is a diagram of an embodiment of massive parallel processing.

Apparently, the throughput is limited by the number of positions to process. Therefore, a Grouped Index (or Index Group) may be used to enable the massive parallel processing shown in FIG. 4. Grouped fashion could be realized as:
Fixed 4×4 for all CU sizes
N×N size for any 2N×2N CU
N/2×2N or 2N×N/2 for any 2N×2N CU For each index group, the context-adaptive binary arithmetic coding (CABAC) state could be re-initialized so as to enable the parallel entropy encoding.

To further improve its coding efficiency, an additional flag can be introduced to indicate whether the current index group is in the same color or can be copied entirely from the above line. With this flag, the coding efficiency is noticeably improved.

In addition to the grouped index coding scheme noted above, a CU size dependent color table size scheme may be implemented to improve coding. Instead of applying the fixed table size for all CU sizes, a CU-dependent adaptive color table size is used. Basically, a smaller color table size is used (either for current table, or reference table, or even both) for smaller CUs. This reduces the resource requirement for smaller CU and also improves the throughput significantly, especially considering the fact that small CU processing presents the bottleneck of the whole processing pipeline.

For instance, 32 can be used as the reference table size and current table size for 64×64 and 32×32 CU, and 16 can be used for 16×16 and 8×8 CU. In addition, further constrains can be applied to the "re-use" color selection process where reference colors are only evaluated and chosen from part of the reference table, as opposed to the entire reference table in the current working draft. With this method, the reference table is set larger than the current table size to better track the history of reference color. In addition, the reference colors are only selected from a subset of the reference table with size equal to the current table, to improve the throughput. For the above example, with this scheme the reference table size is increased to 64 and the current table size is kept unchanged as described above. However, the re-use flag evaluation is constrained for the first 32 entries of 64×64 and 32×32 CU, and only the first 16 entries for 16×16 and 8×8 CUs. This can further improve the coding throughput. Also, the re-use vector only needs to be signaled with the same number as the size of the current table instead of uniform 64-bin vectors.

In addition to the CU size dependent color table size scheme noted above, an extended search for the COPY_ABOVE_MODE may be implemented to improve coding. The index map coding of palette (PLT) mode in the current HEVC SCC draft has two modes: COPY_INDEX_MODE and COPY_ABOVE_MODE. The COPY_ABOVE_MODE uses only adjacent upper row as a reference. The COPY_ABOVE_MODE may be extended to refer to additional rows farther up in current CU. The difference between the current row and the reference row is coded using unary coding and truncated binary coding, or any other binarization scheme. The search distance is limited by current CU.

In addition to the extended search for the COPY_ABOVE_MODE scheme noted above, a two-dimensional (2-D) match with a dynamic width and height may be implemented to improve coding. The index map coding of PLT mode in the current HEVC SCC draft uses a run-based one-dimensional (1-D) match. For any given location, when performing the run-based 1-D search, a 2-D search with varying width and height is also performed. If the area covered by the 2-D search method is larger than 1-D run value, the 2-D string mode is selected and its block vector (e.g., bvx, bvy) and height and width are encoded into the bitstream. Otherwise, the 1-D match mode is selected and its run value is encoded into the bitstream.

A one-bit flag 2D_flag is added in the syntax to indicate whether the current string mode is 2-D or 1-D. If the 2D_flag=1, its block vector (e.g., bvx, bvy) is encoded. A one-bit bvx0 flag is added to indicate whether bvx=0 and a one-bit bvy0 flag is added to indicate whether bvy=0. A one-bit bvx_sign flag is added to indicate whether bvx>0 and a one-bit bvy_sign flag is added to indicate whether bvy>0, if the corresponding flag (e.g., bvx0 or bvy0) is equal to zero. The absolute value of bvx or bvy is encoded using, for example, a fixed length with context or a truncated binary code with context, etc., if the corresponding flag (e.g., bvx0 or bvy0) is equal to zero. The value of 2-D width and height are also encoded using either a context based or a non-context based coding method. When both the block vectors bvx and bvy are equal to zero, but 2D_flag=1, it means that the 2-D block is actually a single color block, and its color indices are encoded to the bitstream. For example, given that the maximum value of bvx, bvy, width, and height is known to both encoder and decoder, a truncated binary coding method can be apply to encode them.

Figure 5:
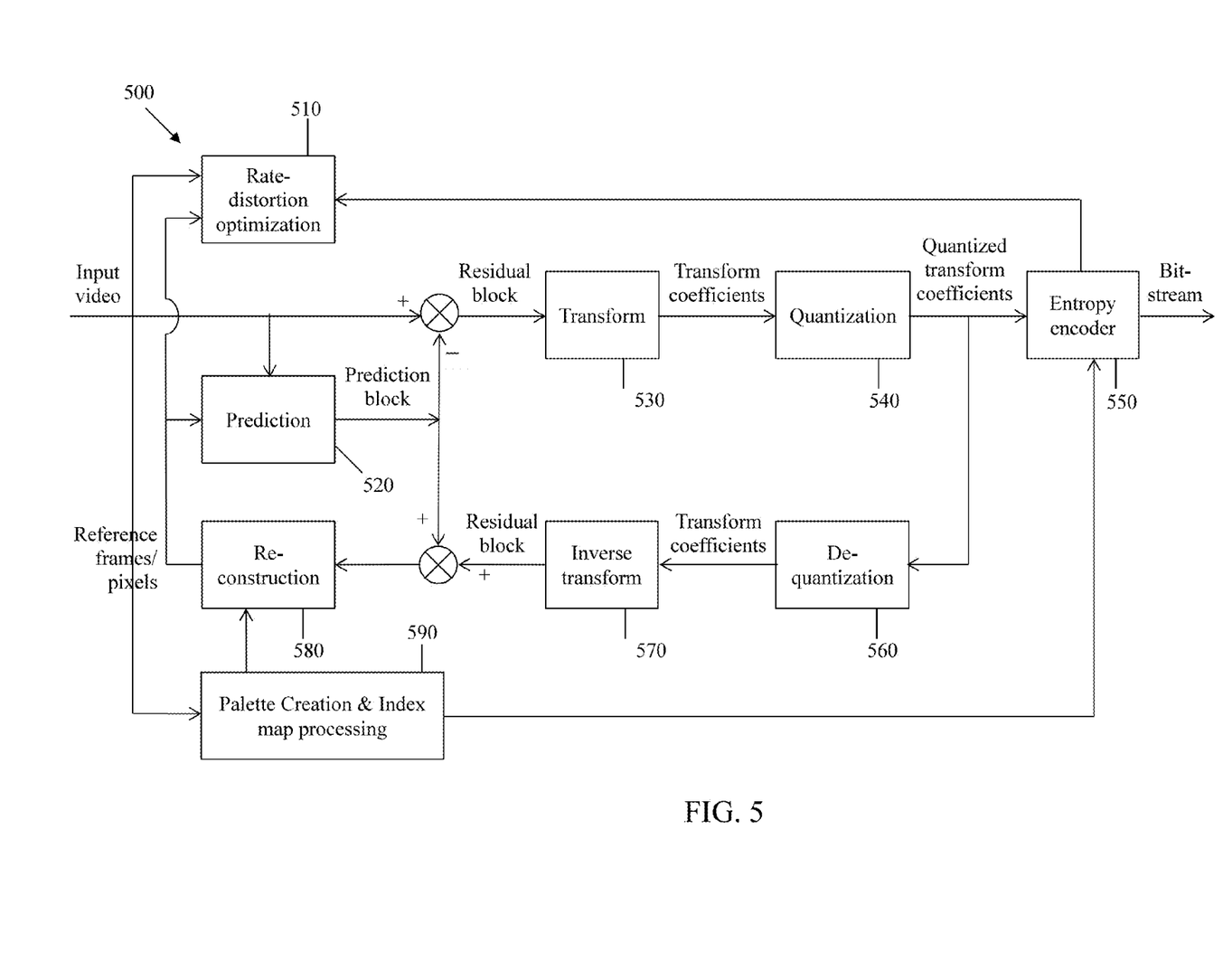
FIG. 5 is a schematic diagram of an embodiment of a video encoder.

FIG. 5 illustrates an embodiment of a video encoder 500. The video encoder 500 may comprise a rate-distortion optimization (RDO) module 510, a prediction module 520, a transform module 530, a quantization module 540, an entropy encoder 550, a de-quantization module 560, an inverse transform module 570, a reconstruction module 580, and a palette creation and index map processing module 590 arranged as shown in FIG. 5. In operation, the video encoder 500 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 510 may be configured to coordinate or make logic decisions for one or more of other modules. For example, based on one or more previously encoded frames, the RDO module 510 may determine how a current frame (or slice) being encoded is partitioned into a plurality of CUs, and how a CU is partitioned into one or more PUs and TUs. As noted above, CU, PU, and TU are various types of blocks used in HEVC. In addition, the RDO module 510 may determine how the current frame is to be predicted. The current frame may be predicted via inter and/or intra prediction. For intra prediction, there are a plurality of available prediction modes or directions in HEVC (e.g., 34 modes for the Y component and six modes (including linear mode (LM)) for the U or V component), and an optimal mode may be determined by the RDO module 510. For example, the RDO module 510 may calculate a sum of absolute error (SAE) for each prediction mode, and select a prediction mode that results in the smallest SAE.

In an embodiment, the prediction module 520 is configured to generate a prediction block for a current block from the input video. The prediction module 520 may utilize either reference frames for inter prediction or reference pixels in the current frame for intra prediction. The prediction block comprises a plurality of predicted pixel samples, each of which may be generated based on a plurality of reconstructed luma samples located in a corresponding reconstructed luma block, and a plurality of reconstructed chroma samples located in a corresponding reconstructed chroma block.

Upon generation of the prediction block for the current block, the current block may be subtracted by the prediction block, or vice versa, to generate a residual block. The residual block may be fed into the transform module 530, which may convert residual samples into a matrix of transform coefficients via a 2-D orthogonal transform, such as a discrete cosine transform (DCT). Then, the matrix of transform coefficients may be quantized by the quantization module 540 before being fed into the entropy encoder 550. The quantization module 540 may alter the scale of the transform coefficients and round them to integers, which may reduce the number of non-zero transform coefficients. As a result, a compression ratio may be increased. In an embodiment, the entropy encoder 550 is configured to implement the inventive concepts disclosed herein.

Quantized transform coefficients may be scanned and encoded by the entropy encoder 550 into an encoded bitstream. Further, to facilitate continuous encoding of blocks, the quantized transform coefficients may also be fed into the de-quantization module 560 to recover the original scale of the transform coefficients. Then, the inverse transform module 570 may perform the inverse of the transform module 530 and generate a noisy version of the original residual block. Then, the lossy residual block may be fed into the reconstruction module 580, which may generate reconstructed samples for intra prediction of future blocks. If desired, filtering may be performed on the reconstructed samples before they are used for intra prediction. In an embodiment, the encoder 500 and/or the palette creation and index map processing module 590 of FIG. 5 are configured to implement the method 200 of FIG. 2A and FIG. 2B.

It should be noted that FIG. 5 may be a simplified illustration of a video encoder, thus it may include only part of modules present in the video encoder. Other modules (e.g., filter, scanner, and transmitter), although not shown in FIG. 5, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 540 and the de-quantization module 560 may be skipped. For another example, if the residual block is encoded directly without being converted to transform coefficients, the transform module 530 and the inverse transform module 570 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 6:
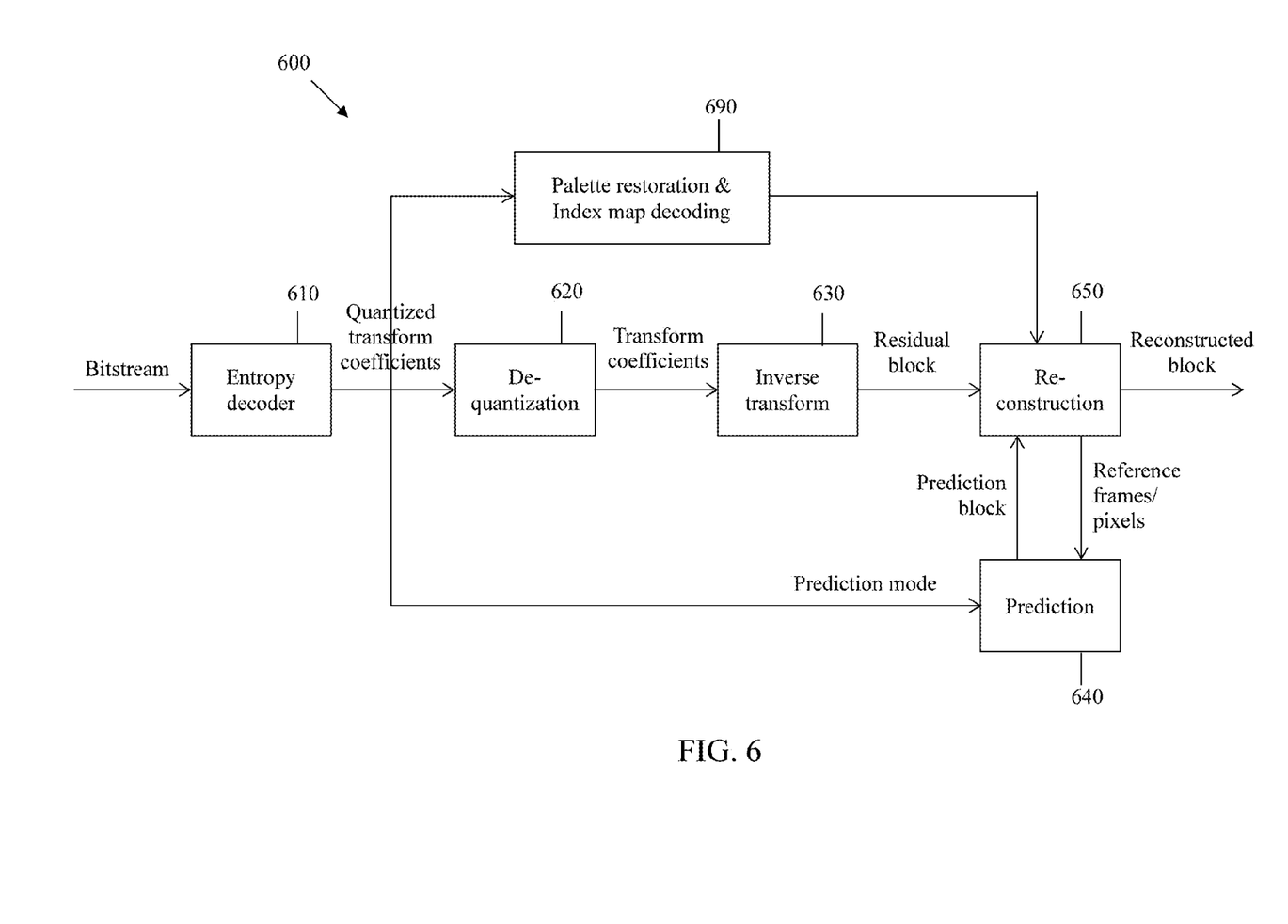
FIG. 6 is a schematic diagram of an embodiment of a video decoder.

FIG. 6 illustrates an embodiment of a video decoder 600. The video decoder 600 may correspond to the video encoder 500 of FIG. 5, and may comprise an entropy decoder 610, a de-quantization module 620, an inverse transform module 630, a prediction module 640, a reconstruction module 650, and a palette restoration and index map decoding module 690 arranged as shown in FIG. 6. In operation, an encoded bitstream containing information of a sequence of video frames may be received by the entropy decoder 610, which may decode the bitstream to an uncompressed format. A matrix of quantized transform coefficients may be generated, which may then be fed into the de-quantization module 620, which may be the same or similar to the de-quantization module 560 in FIG. 5. Then, output of the de-quantization module 620 may be fed into the inverse transform module 630, which may convert transform coefficients to residual values of a residual block. In addition, information containing a prediction mode of the current block may also be decoded by the entropy decoder 610. The prediction module 640 may generate a prediction block for the current block based on the inventive concepts disclosed herein. In an embodiment, the entropy decoder 610 and/or the palette restoration and index map decoding module 690 are configured to implement the inventive concepts disclosed herein.

Figure 7:
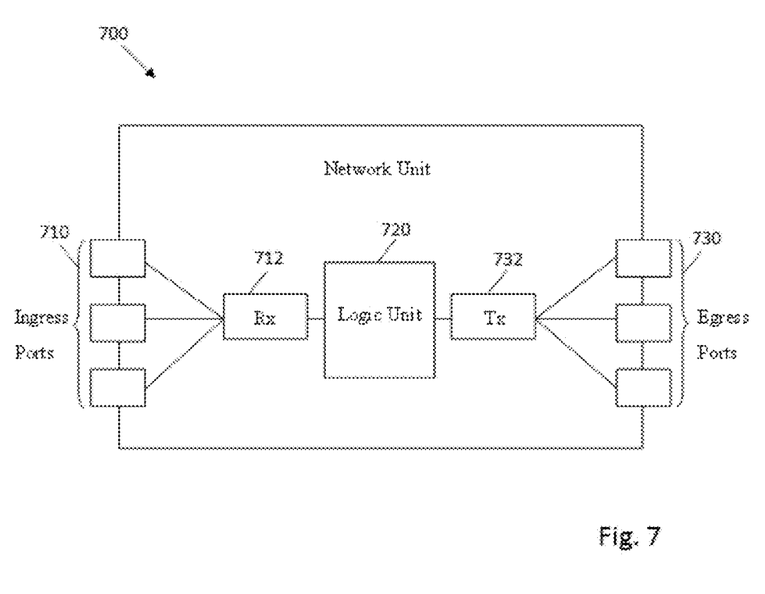
FIG. 7 is a schematic diagram of an embodiment of a network unit that may comprise an encoder and decoder.

FIG. 7 illustrates an embodiment of a network unit 700, which may comprise an encoder (e.g., encoder 500 of FIG. 5) and decoder (e.g., decoder 600 of FIG. 6) that processes video frames as described above, for example, within a network or system. The network unit 700 may comprise a plurality of ingress ports 710 and/or receiver units (Rx) 712 for receiving data from other network units or components, logic unit or processor 720 to process data and determine which network unit to send the data to, and a plurality of egress ports 730 and/or transmitter units (Tx) 732 for transmitting data to the other network units. The logic unit or processor 720 may be configured to implement any of the schemes described herein, such as encoding and decoding using the escape as match concept described above and/or the method of FIGS. 2A-2C. The logic unit 720 may be implemented using hardware, software, or both.

Figure 8:
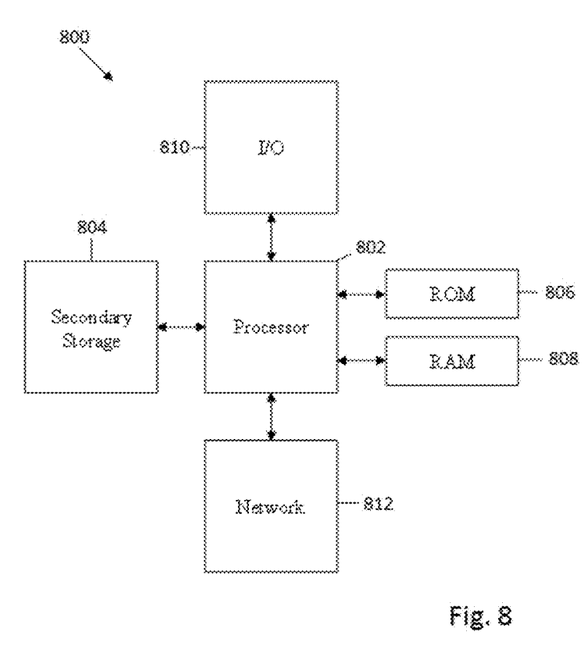
FIG. 8 is a schematic diagram of a typical, general-purpose network component or computer system.

The schemes described above may be implemented on any general-purpose network component, such as a computer or network component with sufficient processing power, memory resources, and network throughput capability to handle the necessary workload placed upon it. FIG. 8 illustrates a schematic diagram of a typical, general-purpose network component or computer system 800 suitable for implementing one or more embodiments of the methods disclosed herein, such as the encoding and decoding methods 200, 250, and 270 of FIGS. 2A-2C. The general-purpose network component or computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. Although illustrated as a single processor, the processor 802 is not so limited and may comprise multiple processors. The processor 802 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 802 may be configured to implement any of the schemes described herein, such as encoding and decoding using the escape as match concept and/or the method of FIGS. 2A-2C. The processor 802 may be implemented using hardware, software, or both.

The secondary storage 804 is typically comprised of one or more disk drives or tape drives and is used for non-volatile storage of data and as an over-flow data storage device if the RAM 808 is not large enough to hold all working data. The secondary storage 804 may be used to store programs that are loaded into the RAM 808 when such programs are selected for execution. The ROM 806 is used to store instructions and perhaps data that are read during program execution. The ROM 806 is a non-volatile memory device that typically has a small memory capacity relative to the larger memory capacity of the secondary storage 804. The RAM 808 is used to store volatile data and perhaps to store instructions. Access to both the ROM 806 and the RAM 808 is typically faster than to the secondary storage 804. One or more of the memory devices disclosed herein (e.g., RAM 808, etc.) may store the software, programming, and/or instructions that, when executed by the logic unit 720 and/or processor 802, implement the method 200, 250, and 270 of FIGS. 2A-2C.

The terms network "element," "node," "component," "module," and/or similar terms may be interchangeably used to generally describe a network device and do not have a particular or special meaning unless otherwise specifically stated and/or claimed within the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of decoding, comprising:
    scanning, using a decoder, strings of index values in a block, wherein one or more of the strings of index values contain same escape colors index values, wherein the escape colors index values represent escape colors, and wherein the escape colors represent colors not included in a palette corresponding to the block;
    sequentially scanning, using the decoder, the escape colors encoded after the strings of index values in the block to determine the escape colors corresponding to each of the same escape colors index values in the strings of index values; and
    displaying, on a display in communication with the decoder, an image utilizing the escape colors determined for each of the same escape colors index values in the strings of index values.

2. The method of claim 1, further comprising receiving, by the decoder, the block in a bitstream transmitted by an encoder.

3. The method of claim 2, further comprising parsing the bitstream to determine the strings of index values and the escape colors sequentially encoded after the strings of index values.

4. The method of claim 1, wherein the escape colors index values from a second string in the block is an exact copy of the escape colors index values from a first string in the block.

5. The method of claim 1, wherein at least one of the strings of index values includes multiple consecutive index values with a single escape color index value.

6. A decoding apparatus, comprising:
    a receiver configured to receive a bitstream containing strings of index values in a block, wherein one or more of the strings of index values contain same escape colors index values, wherein the escape colors index values represent the escape colors, and wherein the escape colors represent colors not included in a palette corresponding to the block;
    a processor operably coupled to the receiver and configured to sequentially decode the escape colors after each of the strings of index values in the block has been decoded, and a display in communication with the processor for displaying an image utilizing the escape colors determined for each of the same escape colors index values in the strings of index values.

7. The decoding apparatus of claim 6, wherein the escape colors index values from a second string is an exact copy of the escape colors index values from a first string.

8. The decoding apparatus of claim 6, wherein the escape colors index values in one or more of the strings of index values is a same numerical value.

* * * * *